United States Patent
Ionfrida et al.

(10) Patent No.: US 8,397,211 B2
(45) Date of Patent: Mar. 12, 2013

(54) WEB PORTAL APPLICATION CUSTOMIZATION METHOD AND SYSTEM USING PROFILES

(75) Inventors: Nicola Ionfrida, Milan (IT); Paolo Cardinale, Milan (IT); Carlo Comis, Pordenone (IT)

(73) Assignee: Accenture Global Services Limited, Dublin (IE)

( * ) Notice: Subject to any disclaimer, the term of this patent is extended or adjusted under 35 U.S.C. 154(b) by 521 days.

(21) Appl. No.: 12/712,835

(22) Filed: Feb. 25, 2010

(65) Prior Publication Data

US 2011/0107294 A1 May 5, 2011

(30) Foreign Application Priority Data

Nov. 2, 2009 (EP) .................................. 09425440

(51) Int. Cl.
*G06F 9/44* (2006.01)
(52) U.S. Cl. ........ 717/105; 717/107; 717/108; 717/112; 717/113; 717/114
(58) Field of Classification Search .................. None
See application file for complete search history.

(56) References Cited

U.S. PATENT DOCUMENTS 6,606,740 B1 * 8/2003 Lynn et al. .................... 717/100
6,990,636 B2 * 1/2006 Beauchamp et al. ......... 715/764

OTHER PUBLICATIONS

European Search Report for co-pending EPO Application No. 09 425 440.6 dated Jul. 5, 2010, 4 pages.

* cited by examiner

*Primary Examiner* — Chuck Kendall
(74) *Attorney, Agent, or Firm* — Brinks Hofer Gilson & Lione

(57) ABSTRACT

Web portal application customization methods and systems using profiles allow developers to expose different functionalities and a different look and feel to users belonging to different user profiles. Specifically, the method allows a developer to define default and profile-specific transitions as well as default and profile-specific states. Upon request of a transition by a workflow engine, the system transparently provides the workflow engine with a profile-specific transition if a profile-specific transition associated with the user is available. If a profile-specific transition is not available, the system provides the application with a default transition. Likewise, the system transparently provides the application with a profile-relevant state according to the profile of the user and the availability of a profile-specific state. Accordingly, the method may implement highly customizable functionalities and look and feel effectively and cost-efficiently.

23 Claims, 12 Drawing Sheets

```
[#load|Outer_StandardFormNoHelp.html|PLAIN#]
[#load|Outer_StandardFormOptions.html|SPN#]

[#part|PLANmainContent#]
    <table class="noStyle">
        <tr>
            <td class="contentCell" style="width:15%">[#lbl|lblTariffPlan#]</td>
            <td class="symmaryValue">[#lbl|txtTariffPlan#]</td>
            <td class="contentCell" style="width:15%>[#lbl|lblInitialCredit#]</td>
            <td class="symmaryValue">[#lbl|txtInitialCredit#]<span> €</span></td>
        </tr>
    </table>
[#endpart#]

[#part|SPNmainContent#]
    <table class="noStyle">
        <tr valign="top">
            <td class="contentCell">[#lbl|lblSpecialNumber#]</td>
            <td class="contentCell">[#txt|txtSpecialNumber#]</td>
            <td class="contentCell">  </td>
            <td class="contentCell">  </td>
        </tr>
    </table>
[#endpart#]
```

FIG. 9

WEB PORTAL APPLICATION CUSTOMIZATION METHOD AND SYSTEM USING PROFILES

BACKGROUND OF THE INVENTION

1. Priority Claim.

This application claims the benefit of EPO Application No. 09425440.6, filed Nov. 2, 2009, which is incorporated herein by reference in its entirety.

2. Technical Field.

This application relates to customization of web portal applications, and more particularly relates to a method and system for supporting the customization of web portal applications using profiles such that highly customized web portal applications may be developed based on a single software code base.

3. Related Art.

More businesses are utilizing the Internet to provide services to other businesses or individuals. Recently, web portal applications, which allow businesses to provide information and services to others on a web site hosted on the Internet, have become a popular means of providing such services. To provide a certain service on the Internet, a web portal application specifically designed to provide such a service was developed. Since a web portal application was designed specifically to provide a certain service, new web portal applications needed to be developed from the ground up to provide a different type of service or to add support for an additional type of service. In addition, as the number of businesses utilizing web portal applications increased and therefore the number of businesses providing similar services on the Internet increased, a need to differentiate the look and feel of the web portal application arose. Also, the user base to which the businesses provided services became larger and more diverse. To accommodate the diversity of the user base and the different types of services offered through the web portal application, a need arose to provide a different application behavior and a different look and feel to suit the requirements of each user.

However, software code underlying the web portal application, in order to provide a new service or to provide a different look and feel for different users, had to be significantly—or even entirely—re-written, and a significant amount of effort and resources had to be invested.

Thus, the technical challenges include providing a method and system that allow an efficient, reliable and cost-effective way to develop a web portal application suited for different kinds of services and users.

SUMMARY

The disclosed method and system provide a more efficient, customizable way of developing a web portal application. The system receives profiles of various types of user. The system further receives default and profile-specific states and default and profile-specific transitions. The states may be bound to web pages which may represent graphical user interfaces ("GUIs") displayed at various steps of a workflow of the web portal application. The transitions may represent business logic performed by a software program between the steps of the workflow. The system further identifies the profile associated with a user of the web portal application. The system selects and retrieves a state from a memory and displays a web page bound to the state. Further, the system may receive from the user a transition input available for the displayed state. The transition input may include, for example, an instruction to proceed to the next state of the workflow or an instruction to return to a previous state of the workflow. Upon receipt of the transition input from the user, the system retrieves from the memory a transition associated with the received transition input ("input-associated transition"). In retrieving the input-associated transition, the system determines whether or not an input-associated transition exists which corresponds to the identified profile of the user ("profile-specific transition"). If a profile-specific transition exists, the system retrieves from the memory the profile-specific transition as the input-associated transition. If no profile-specific transition exists, the system retrieves from the memory a default transition associated with the received transition input as the input-associated transition. Subsequently, the system performs the tasks specified in the retrieved input-associated transition.

In retrieving the selected state, the system determines whether or not a version of the selected state exists which corresponds to the identified profile of the user ("profile-specific state"). If a profile-specific state exists, the system retrieves from the memory the profile-specific state as the selected state. If no profile-specific state exists, the system retrieves from the memory a default version of the selected state as the selected state.

Other systems, methods, features and advantages will be, or will become, apparent to one with skill in the art upon examination of the following figures and detailed description. All such additional systems, methods, features and advantages are included within this description, are within the scope of the invention, and are protected by the following claims.

BRIEF DESCRIPTION OF THE DRAWINGS

The system may be better understood with reference to the following drawings and description. The elements in the figures are not necessarily to scale, emphasis instead being placed upon illustrating the principles of the various embodiments of the invention. In the figures, like-referenced numerals designate corresponding features throughout the different views.

FIG. 9 shows an example of software code for templates used for implementing a GUI.

DETAILED DESCRIPTION OF THE PREFERRED EMBODIMENTS

Figure 1:
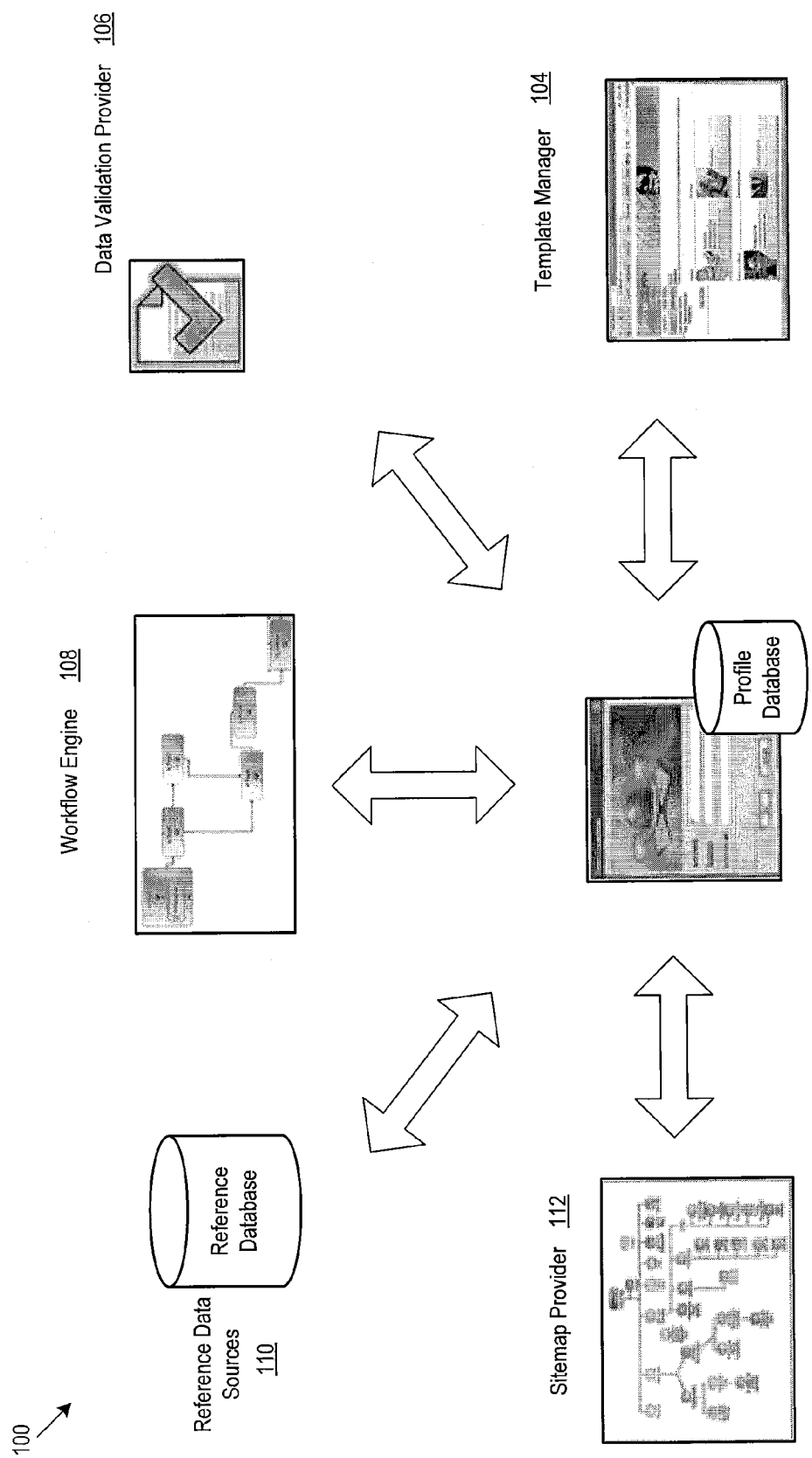
FIG. 1 shows a general overview of the components of an embodiment of the invention.

FIG. 1 shows an overview 100 of the components of an embodiment of the system according to the current invention ("system"). The system includes a profile manager 102 which stores and manages user profile information. The profile manager 102 may communicate with various components of the system such as a template manager 104, a data validation provider 106, a workflow engine 108, reference data sources 110 and a sitemap provider 112. The profile manager 102 may provide user profile information to the system components upon request by the system components. The workflow engine 108 drives the application processes as well as the user interaction through a sequence of defined steps. The workflow engine 108 may be implemented, for example, using Microsoft™ Windows Workflow Foundation™ technology. The template manager 104 may be implemented as an independent component which may provide templates on which a graphical user interface (GUI) of the web portal application may be built. The template manager 104 allows for a complete separation between the data and their presentation to the user. The data validation provider 106 may also be an independent component communicating with the profile manager 102 to provide various data checking services as required by the workflow of the web portal application. The data validation provider 106 may also be in communication with the template manager 104 (not shown). Reference data sources 110 may be a database which may store miscellaneous reference data sources, such as repositories for storing data which may be needed for implementing a web portal application, interface messages and localization databases. The sitemap provider 112 may also be an independent component which may store information about the hierarchy of web pages, flow structure and accessible resources. The sitemap provider 112 may be implemented using, for example, Microsoft™ ASP. NET™ framework.

Figure 2:
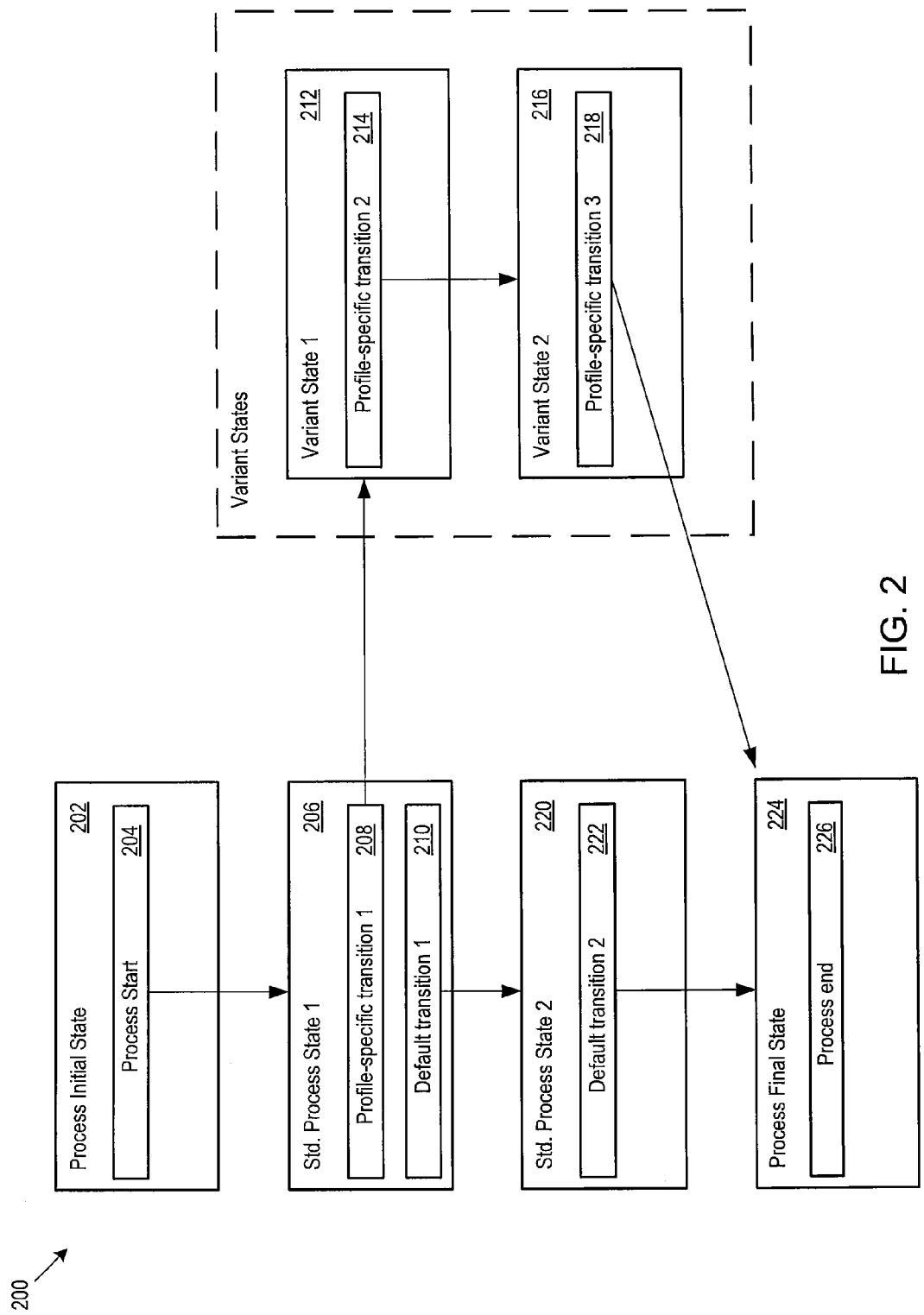
FIG. 2 shows a brief overview of the operation an embodiment of the invention.

FIG. 2 shows an example 200 of the operation of the system to provide a customizable workflow using profiles. A workflow may comprise a sequence of data retrieval, product configuration, and/or data submission steps and may be represented as a sequence of states linked to each other by transitions. The transitions and the states may be implemented as instances of base classes defined by the Microsoft™ Windows Workflow Foundation™ library. A state may be bound to a specific web page for data presentation and data entry by a user. A state's association with a specific web page may be implemented by extending the Windows Workflow Foundation™ component using, for example, Microsoft™ Web Client Software Factory™, allowing each state to point to a specific web page. The web pages may be implemented and stored by an independent component, for example an ASP.NET™ library. A transition may define a sequence of tasks to be executed sequentially in order to proceed successfully to the next state in the workflow. The task defined in the transition may be business logic necessary for implementing a web portal application. Associations between the states and the transitions may be implemented, for example, by storing their associations in XML files, which may be edited through visual editing tools. Transitions between the states may be triggered by user input.

The workflow engine 108 may begin a workflow of a web portal application by selecting an initial state 202. The initial state 202 may be associated with the transition "process start" 204, which may navigate the workflow to the "standard process state 1" 206. The state 206 may be associated with a transition 210 which performs a default task, and a profile specific variant transition 208, which performs a task specific to a profile. While the example 200 shows that only one variant transition 208 is associated with the "standard process state 1" 206, more than one variant transition may be associated with a state.

A variant is a transition or state which is selected and executed by the system only for a user having a specific profile. The workflow engine 108 may request a transition to be performed. Upon a request for a transition by the workflow engine 108, the system may engage in "profiling", meaning that the system may select and perform a version (default or variant) of the transition according to the profile of the current user. The "profiling" process is transparent to the workflow engine 108. Therefore, the workflow engine 108 need not indicate a version of the transition to be performed. Through "profiling", the system performs the variant transition—the "profile-specific transition 1" 208—if the profile of the current user matches the profile with which the "profile-specific transition 1" is associated, and performs the default transition—the "default transition 1" 210—if the profile of the current user does not match that of the "profile-specific transition 1".

If the current user's profile matches that of the "profile-specific transition 1" 208, the "profile-specific transition 1" may navigate the workflow to the "variant state 1" 212. In turn, the "variant state 1" 212 may be associated with a "profile specific transition 2" 214, which may navigate the workflow to the "variant state 2" 216. The variant state 216 may be associated with a "profile-specific transition 3" 218, which may navigate the workflow to the "process final state" 224. On the other hand, at state 206, if the profile of the current user does not match that of the "profile-specific transition 1" 208, the system will perform the "default transition 1" 210, which may navigate the workflow to the "standard process state 2" 220. The "standard process state 2" 220 may be associated with the "default transition 2" 222, which may navigate the workflow to the "process final state" 224. The "process final state" 224 may be associated with the "process end" transition 226, which may end the workflow of the web portal application. As the example above describes, the system may, by engaging in profiling, provide for different workflows tailored to different user profiles using a single implementation of the workflow engine 108, rather than having to implement different workflows for each user having a different profile.

Figure 3:
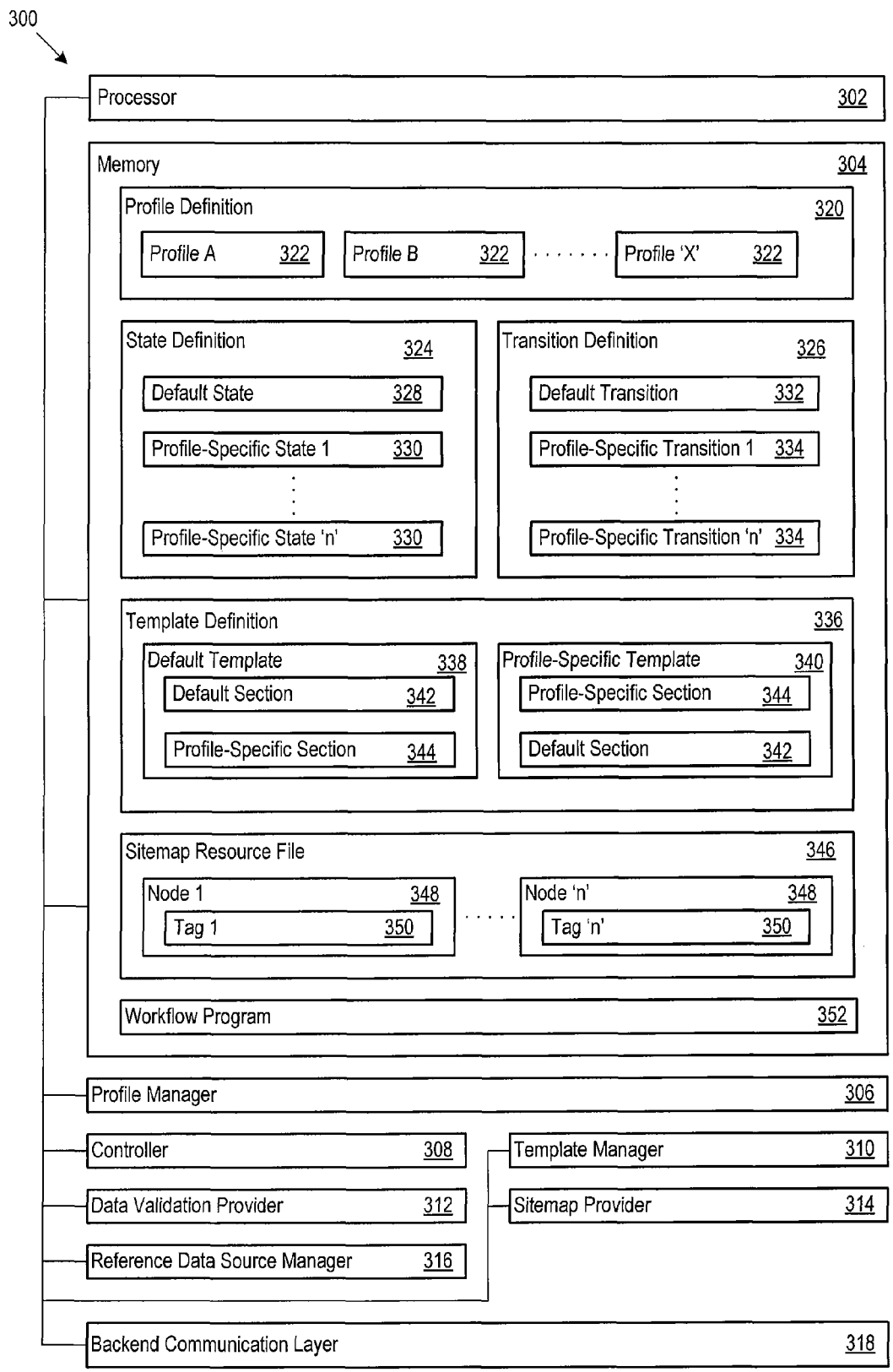
FIG. 3 shows a system diagram of an embodiment of the invention.

FIG. 3 shows the general configuration of a system 300 of an embodiment of the invention. The system 300 includes a processor 302, a memory 304, a profile manager 306, a controller 308, a template manager 310, a data validation provider 312, a sitemap provider 314, a reference data source manager 316, and a backend communication layer 318. The components 302-318 may be coupled and be in communication among each other. The memory 304 may include a profile definition 320. The profile definition 320 may include profiles 322 for a number of different users or a number of different types of users. A profile 322 may be implemented as a character string. For example, users associated with a company XYZ may be associated with a profile 322 which may be implemented as the character string "XYZ_Profile". The profile 322 may be referenced by the components of the system 300 to select appropriate business logic suitable for a user associated with the profile.

The memory 304 may further include a state definition 324 and a transition definition 326. The state definition 324 may further include a default state 328 and profile-specific states 330. Each profile-specific state is associated with a specific profile. The transition definition 326 may include a default transition 332 and profile-specific transitions 334. Each profile-specific transition is associated with a specific profile.

The memory 304 may also contain a template definition 336, which stores a default template 338 and profile-specific templates 340. Templates define the layout of the user interface of the web page that is bound to each state. A default template may further contain default sections 342 and/or profile-specific sections 344. The templates may be implemented using the hypertext mark-up language (HTML). Templates allow for a simplified user interface creation and management. Using templates increases the separation between the user interface data management (data retrieval/interface build-up/read and store of user inputs) and the layout/rendering of the web page. For example, templates allow for independent management of the different features of the page layout, allowing for the reuse of recurring features, such as frames and data presentation forms, across many different web pages.

The memory 304 may also include a sitemap resource file 346. The sitemap resource file 346 stores information regarding the hierarchy of web pages and accessible resources available to a user. The sitemap resource file 346 may be implemented as an extensible markup language (XML) document. A web page may be represented as a node 348 inside the sitemap resource file 346. Each node may contain a tag 350, indicating association of the node with a profile of a user. The node 348 may also include other information regarding the web page it represents, such as properties of the web page.

The memory 304 may also contain a workflow program 352 containing logic which, when executed by the processor 302, causes the system to execute the workflow of the web application. The workflow engine 108 may be implemented as a part of the workflow program 352.

The profile manager 306, which may be implemented as an independent component, identifies the identity of the current user, identifies the profile associated with the current user, and provides the identified profile information to components of the system 300 requesting such information. The controller 308 receives user inputs, and manages the transitions according to the user inputs and the workflow of the web portal application. The template manager 310 manages templates, which the system 300 utilizes to build the user interfaces of the web pages that are bound to the states of the web portal application. At the request of the workflow program 352, the template manager 310 may retrieve the relevant template according to the profile of the current user to build the user interface of the web page.

The data validation provider 312 may also be implemented as an independent component which receives data and performs validation on the data according to the profile of the user. The received data may be, for example, data input by the user in response to the request by the web portal application implemented by the system 300. Validation may be, for example, performing an integrity check on the date received to ensure that the data received conforms to a predefined rule. In an illustrative example, a web page may be configured to receive a bank account number from a user. The bank account number received through the web page may be transmitted to and validated by the data validation provider 312. Data validation provider 312 may provide the results back to the workflow program 352, which may utilize the results according to the needs of the web portal application implemented by the system 300. In the illustrative example discussed above, the bank account number may be validated by the data validation provider 312 for proper format, and the workflow program 352 may issue a warning to the user if the format of the bank account number is not proper.

The sitemap provider 314 may be implemented as an independent component which manages the sitemap resource file 346. At the request of the workflow program 352, the sitemap provider may search through the sitemap resource file 346 for a node 348 to identify properties associated with a web page and provide the identified information to the workflow application.

The reference data source manager 316 manages reference data which may be stored in the memory 304. The reference data may be for example, a list of values or configuration data which may be used in building the user interface of a web page or may otherwise be used in executing the workflow program 352.

The backend communication layer 318 manages communications between the system 300 and backend systems such as SRM and billing systems which may be necessary for the execution of the web portal application implemented by the system 300.

Figure 4:
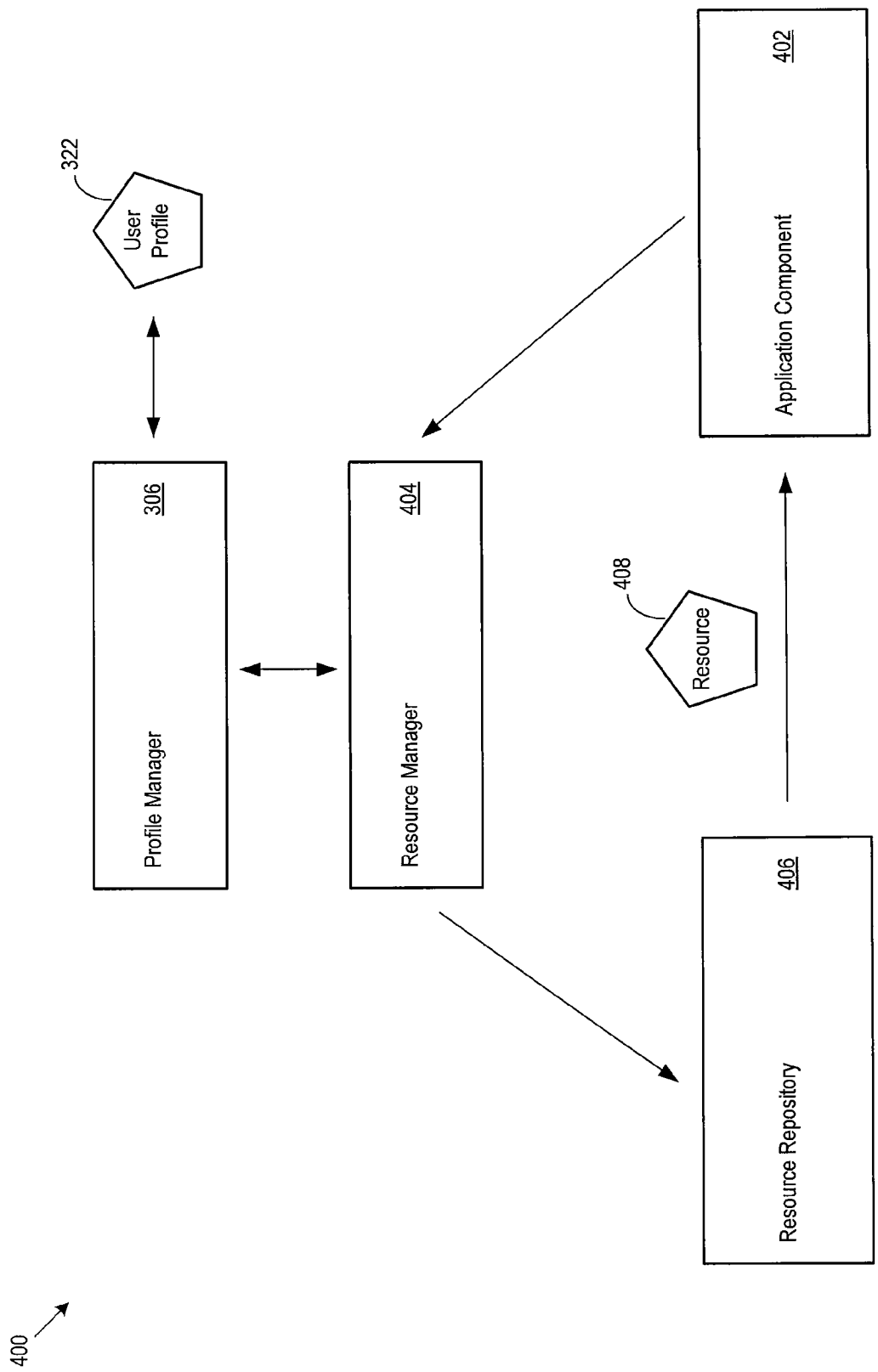
FIG. 4 shows an overview of the profile-managing mechanism of an embodiment of the invention.

FIG. 4 shows an overview representing the profile-managing mechanism 400 which may be implemented in the system 300. The profile-managing mechanism 400 may include three types of components: the application component 402, the resource manager 404, and the resource repository 406.

The application component 402 represents a component of the system 300 which implements specific business requirements. The application component 402 may request a resource 408 necessary for the fulfillment of the business requirements from a resource manager 404. An example of an application component 402 is the workflow program 352, which may request a resource 408 required for execution of the workflow of the web portal application from the resource manager 404. In an illustrative example, in order to display a webpage bound to a state of a workflow, the workflow program 352 may request from the resource manager 404 a resource 408 necessary for displaying the web page bound to the state. In this example, the resource 408 may be a template for building the user interface of the webpage bound to the state of the workflow.

The resource manager 404 represents components of the system 300 which may receive requests from an application component 402 for a resource 408, and may cause an appropriate resource to be provided to the application component. The request for a resource 408 by the application component 402 may indicate the type of resource needed for fulfilling the business requirement that the application component 402 implements. The request may be made without indicating whether a profile-specific resource or a default resource is requested. In other words, the request made by the application component 402 is not "profiled". Rather, the resource manager 404 effectively "profiles" the request by receiving a request and causing a "profiled" resource 408 to be delivered to the application component 402. In other words, the resource manager 404 causes an appropriate resource 408 corresponding to the profile of the current user to be provided to the application component 402. Depending on the type of request of the application component 402, the resource manager 404 may be the controller 308, the template manager 310, the data validation provider 312, the sitemap provider 314, the reference data source 316, or other components of the system 300 which may manage and cause data to be provided to the application component 402.

Upon request by the application component 402 for a resource 408, the resource manager 404 may communicate with the profile manager 306 to identify a user profile 322 associated with the current user. The resource manager 404 may search the resource repository 406 to identify a correctly profiled version of the requested resource 408, i.e., the version of the requested resource which corresponds to the identified profile 322.

The resource repository 406 may represent a repository or a group of repositories which store the resources 408. If a profile-specific version of the requested resource 408 corresponding to the profile 322 of the current user is identified, the resource manager 404 causes the resource repository 406 to provide the identified profile-specific version of the requested resource to the application component 402. If a profile-specific version of the requested resource 408 corresponding to the profile 322 of the current user is not identified, the resource manager 404 causes the resource repository 406 to provide a default version of the requested resource to the application component 402. The resource repository 406 may be the memory 304, or a memory or a database system specifically provided to store the type of resource managed by a specific resource manager 404.

The requested resource 408 may be, for example, a transition or a state managed by the controller 308, a template managed by the template manager 310, page property information managed by the sitemap provider 314, or data managed by the reference data source manager 316.

A profile-specific resource may be identified by the profile name appended to the end of the name of the resource 408. If the profile is called "profileA", the resource manager 404 may look for a resource 408 with the name of the profile, "profileA", appended to the end of the name of a resource. For example, if a template is named "main_window", the name of a default version of the template may be "main_window", while a profile-specific version of the template corresponding to a user associated with the "profileA" may be named "main_window_profileA". Therefore, a template manager 310 processing a request for the template "main_window" for a profileA-user may look for the string "profile_A" appended to the end of the name "main_window".

Utilizing the web portal application customization system, a single web portal application may be developed to support variants which serve the needs of different businesses providing different services to its respective customers. In an illustrative example, a single web portal application may be developed for selling telephone cards to customers by two different companies, a company A and a company B. While some features of the phone cards or services provided by the web application may be similar, by using variants and profiles, the two companies may provide different user experience to the users and sell telephone cards having different features through a single web application. Different profiles may be associated with the customers of different companies, and differentiation of product features and user experience may be achieved by providing the variants associated with the profile of the current user to the workflow of the web portal application.

Figure 5:
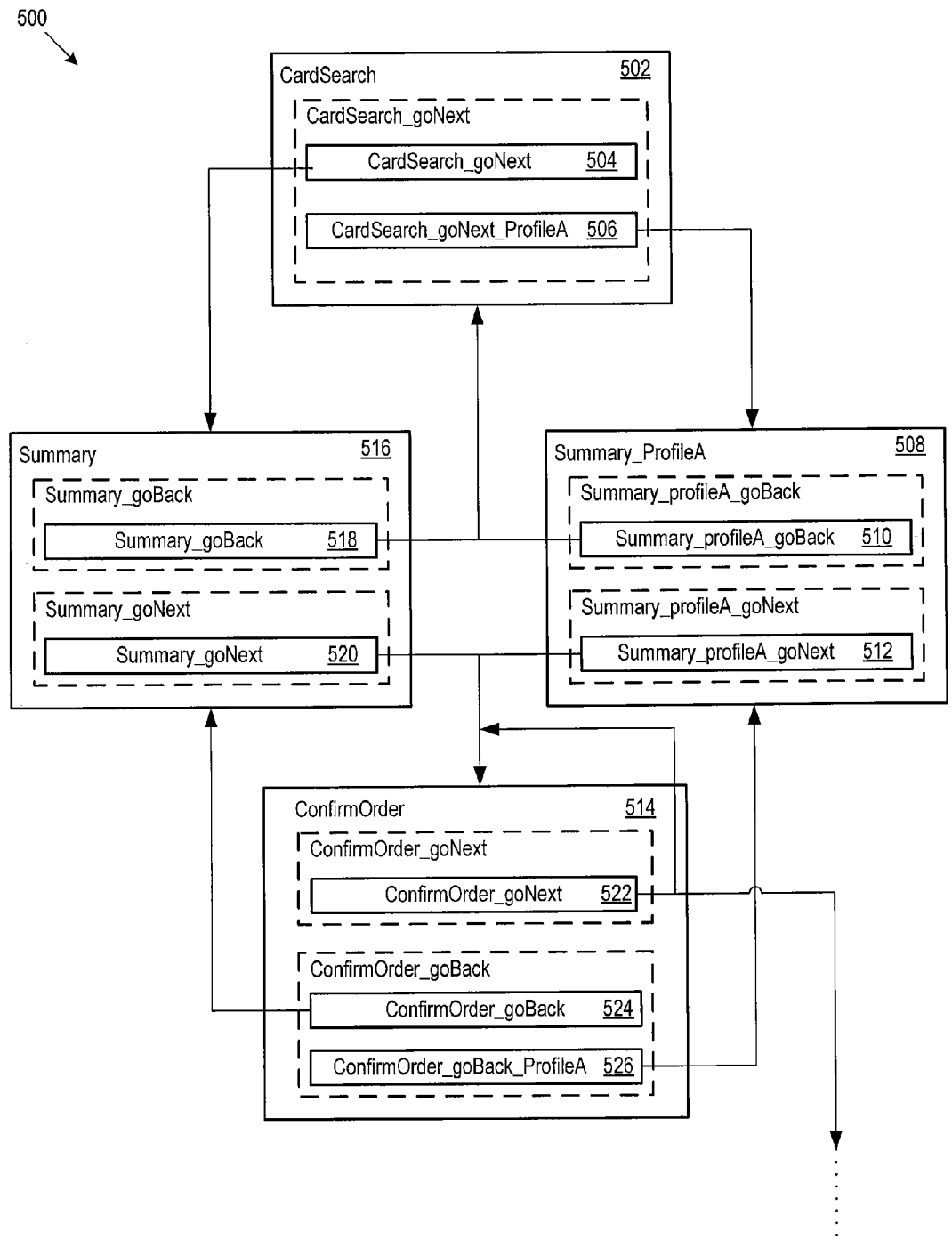
FIG. 5 shows an example of a state diagram of the operation of an embodiment of the invention.

FIG. 5 shows a diagram 500 illustrating an example of a relationship between the states and the transitions as implemented in a web portal application supporting multiple profiles. An initial state of a workflow may be set as the "CardSearch" state 502, which is associated with the transition "CardSearch_goNext". When the system 300 receives a transition input for the transition "CardSearch_goNext", the workflow program 352 requests from the controller 308 a transition associated with the received transition input. The controller 308 communicates with the profile manager 306 to identify and retrieve the profile 322 of the current user. Using the information in the profile 322, the controller 308 identifies a "profiled" transition (a "profiled" resource 408) in the memory 304 (the resource repository 406), and causes the memory 304 to provide the identified "profiled" transition to the workflow program 352.

In the example shown in FIG. 5, two types of resource 408 are available for the transition input "CardSearch_goNext"—the default transition "CardSearch_goNext" 504 and the profile-specific transition "CardSearch_goNext_profileA" 506. In this case, the controller 308 identifies the transition "CardSearch_goNext_profileA" 506 as the profile-specific resource 408 since the string "profileA" is appended to the end of the name of the transition "CardSearch_goNext". If the profile of the current user is "profileA", the system 300 may select and execute the task defined in the profile-specific transition 506. If the current user's profile is not "profileA", the controller may not find a profile-specific resource for the profile of the current user. In this case, a default resource 408—the transition 504—may be selected and executed by the system 300. In the case of a profileA-user, the transition 506 may cause the workflow to proceed to the profile-specific state 508.

The state 508 may be bound to a web page summarizing a list of phone cards that may be available for purchase, designed specifically for profileA-users. The state 508 may have two profile-specific transition inputs associated with it—the transition input "Summary_profileA_goBack" and the transition input "Summary_profileA_goNext". The resource repository 406 may store transitions 510 and 512, respectively, for the transition inputs. The transition 510 may cause the workflow to return to the previous state 502, and the transition 512 may cause the workflow to proceed to the next state, the "ConfirmOrder" state 514.

In state 502, if the profile of the current user is not "profileA", the system 300 may retrieve and execute the default transition 504, causing the workflow to proceed to the default state—the "Summary" state 516. The state 516 may also display a web page summarizing a list of phone cards that may be available for purchase, designed for use by any non-profileA-users. The state 516 may be associated with two default transition inputs—the transition input "Summary_goBack" and the transition input "Summary_goNext". The resource repository 406 may store the transitions 518 and 520, respectively, for the transition inputs. The transition 518 may allow the workflow to return to the previous state 502, and the transition 520 may allow the workflow to proceed to the next state, the "ConfirmOrder" state 514. Since, in this example, no profile-specific state is associated with the state 514, both transitions 512 and 520 may proceed to the same state 514. The state 514 may be associated with two types of transition inputs—the transition input "ConfirmOrder_goNext" and the transition input "ConfirmOrder_goBack". In this case, the transition input "ConfirmOrder_goNext" does not have a profile-specific transition associated with it. Therefore, if a transition input for the transition "ConfirmOrder_goNext" is received from the user, the system 300 may execute the default transition, the transition "ConfirmOrder_goNext" 522, for users with any types of profiles. However, a profile-specific transition exists for the transition input "ConfirmOrder_goBack". Therefore, if a transition input for the transition "ConfirmOrder_goBack" is received from the user, the system 300 may execute the default transition, the transition "ConfirmOrder_goBack" 524, for the non-profileA-users, and the profile-specific transition, the transition "ConfirmOrder_goBack_ProfileA" 526, for all profileA-users.

Figure 6:
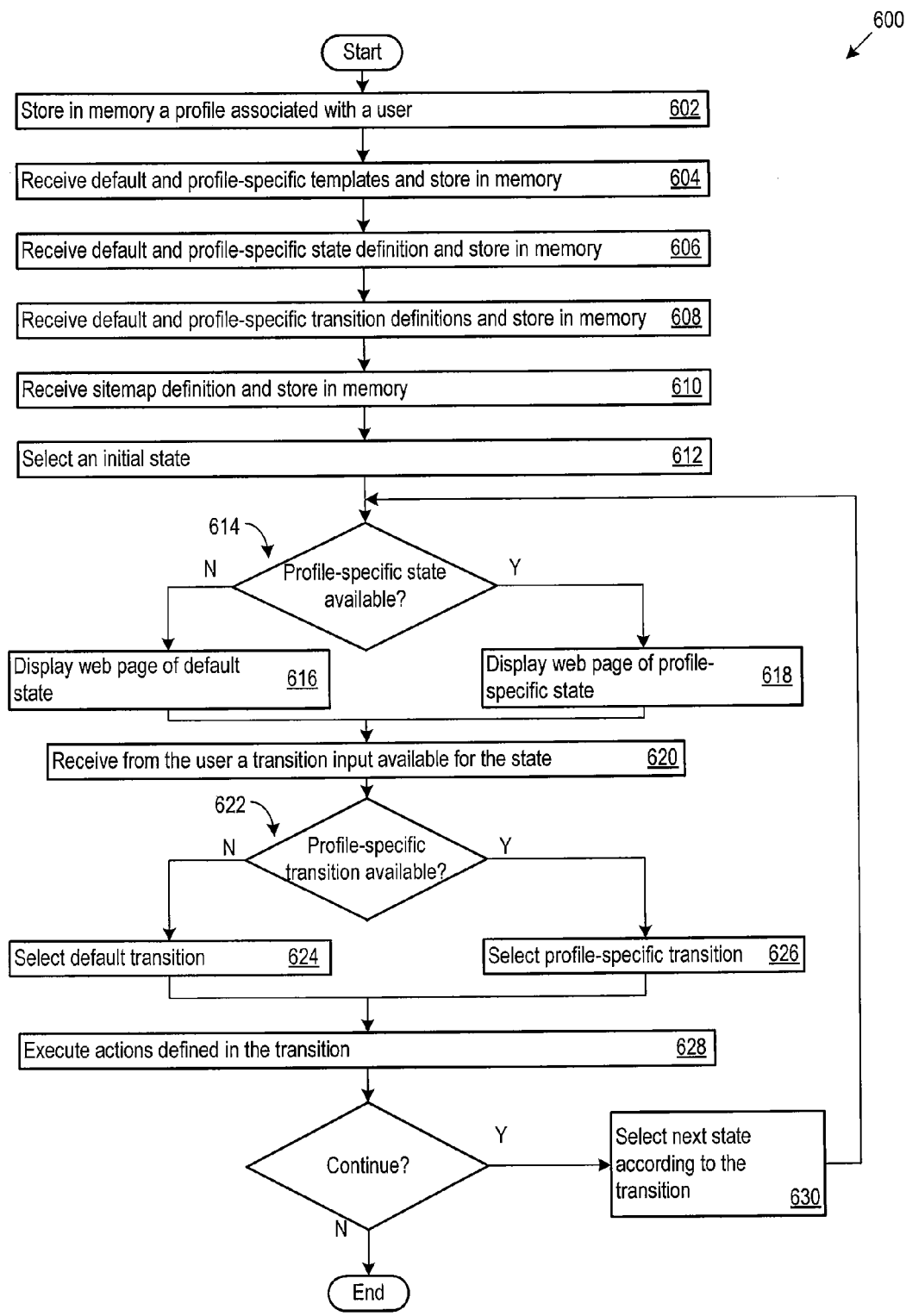
FIG. 6 shows a flow diagram of logic that an embodiment of the invention may employ to provide customizable workflow of a web portal application.

FIG. 6 shows a flow diagram 600 of logic that the workflow program 352 of the system 300 may implement. The system 300 may receive from a developer of a web portal application a profile associated with a type of a user and store the profile in a resource repository 406 such as the memory 304 (602). The system 300 may further receive from the developer of the web portal application and store in memory 304: default and profile-specific templates (604), default and profile-specific state definitions (606), default and profile-specific transition definitions (608), and a sitemap resource file 346 (610). The receiving and storing of the default and profile-specific templates, the default and profile-specific state definitions, the default and profile-specific transition definitions and the sitemap resource file may also be performed by other systems independent of the workflow program 352.

When the execution of the workflow begins, the system 300 selects an initial state (612). Next, the system 300 engages in "profiling" of the initial state—the workflow program 352 requests an initial state from the controller 308, and the controller causes a "profiled" initial state to be provided to the workflow program 352. In other words, the system 300 determines whether or not a profile-specific state corresponding to the profile of the current user exists (614). If a profile-specific state does not exist, the system selects a default state (616) and displays the web page to which the default state is bound. On the other hand, if the system 300 identifies a profile-specific state corresponding to the profile of the current user, the system selects the profile-specific state (618) and displays the web page to which the state is bound.

At either the default or the profile-specific states, the system 300 may receive a transition input from a user, indicating a selection by the user among the transitions available for the displayed web page (620). Upon receiving the transition input from the user, the system 300 engages in "profiling" of the transition associated with the received transition input—the workflow program 352 requests a transition associated with the received transition input from the controller 308, and the controller causes a "profiled" transition associated with the received transition input to be provided to the workflow program 342. In other words, the system 300 determines whether or not a profile-specific transition corresponding to the transition input exists (622). And if a profile-specific transition does not exist, the system 300 selects a default transition corresponding to the transition input (624). If a profile-specific transition for the transition input exists, the system 300 selects the profile-specific transition corresponding to the transition input (626). Once either the default transition or the profile-specific transition is selected, the system 300 performs the actions defined in the selected transition (628). Depending on the actions defined in the transition, the workflow application 352 may end, or may select the next state according to the workflow (630). If a next state is selected, the logic may repeat from step 614 described above.

Figure 7A:
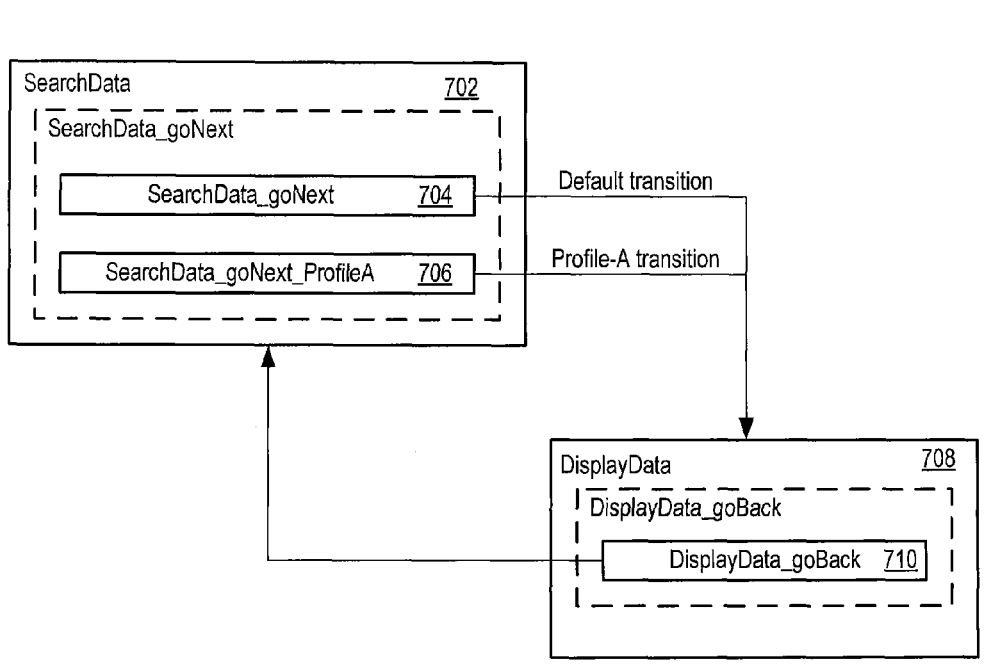
FIG. 7A shows an example of transitions which may be implemented in an embodiment of the invention.

In addition to being defined to proceed to a certain state, the transition may also be defined to perform a profile-specific task before proceeding from one state to another. FIG. 7A shows an illustrative example 700a of a default transition and a profile-specific transition proceeding to the same state. A state 702 may be associated with a transition which allows the workflow to proceed to the state 708. In this example, the resource repository 406 contains a default transition 704 and a profile-specific transition 706 for the transition "SearchData_goNext". Both the default transition 704 and the profile-specific transition 706 instruct the workflow to proceed to the same default state 708. However, both the default transition 704 and the profile transition 706 may be defined to perform a business process specific to a profile before proceeding from state 702 to state 708.

Figure 7B:
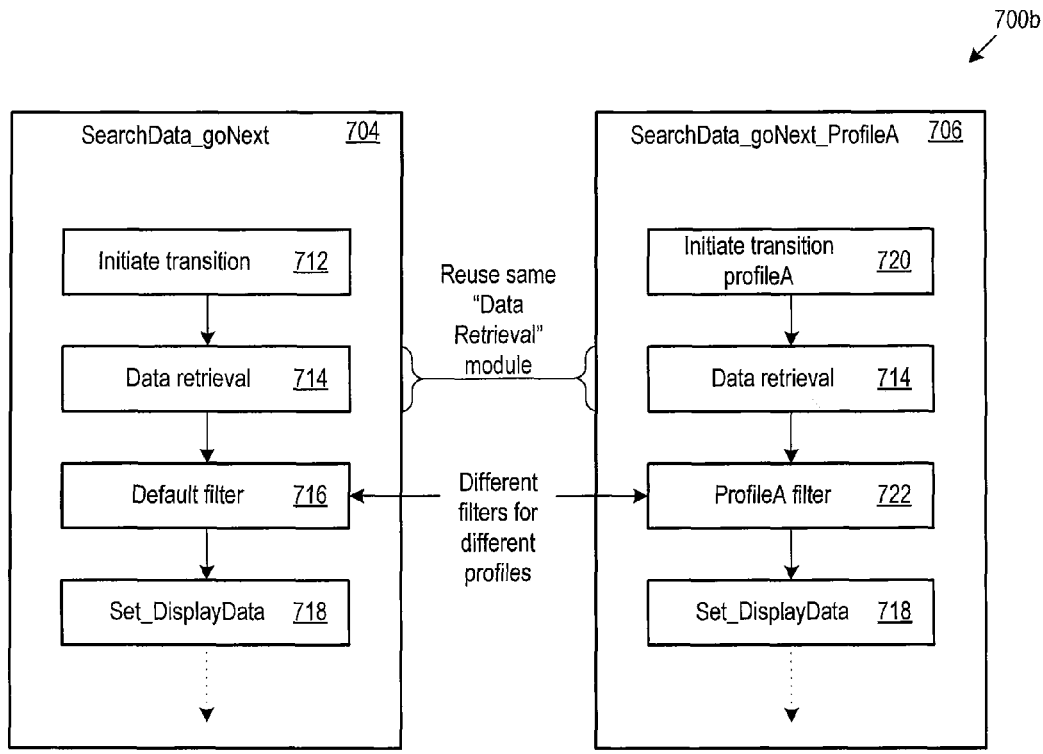
FIG. 7B shows a diagram of a series of tasks which may be implemented in transitions in an embodiment of the invention.

FIG. 7B shows a diagram 700b of a series of tasks which may be implemented in the transitions described in FIG. 7A.

The default transition 704 may begin with a task 712 which may initiate the transition. Next, the default transition 704 may execute the data retrieval module 714 for retrieving necessary data, for example, from the resource data source 316. A default filter 716 may be applied to the retrieved data, and the default transition 704 may execute the module 718 for proceeding to the next state 708.

The profile-specific transition 706 may begin with a task 720 which may initiate the transition. Next, the transition 706 may execute the data retrieval module 714 for retrieving necessary data, for example, from the resource data source 316. The retrieval module 714 may be the same module as the one used by the default transition 704. Subsequently, a profile-specific filter 722 may be applied to the retrieved data, and the profile-specific transition 706 may execute the module 718 for proceeding to the next state 708. Again, the module 718 for allowing the workflow to proceed to the next state 708 may be the same module used by the default transition 704. As described above, the default transition 704 and the profile-specific transition 706 may be both defined to allow the workflow to proceed to the same state 708, while performing data retrieval and filtering tasks which are specific to their associated profiles.

Figure 8:
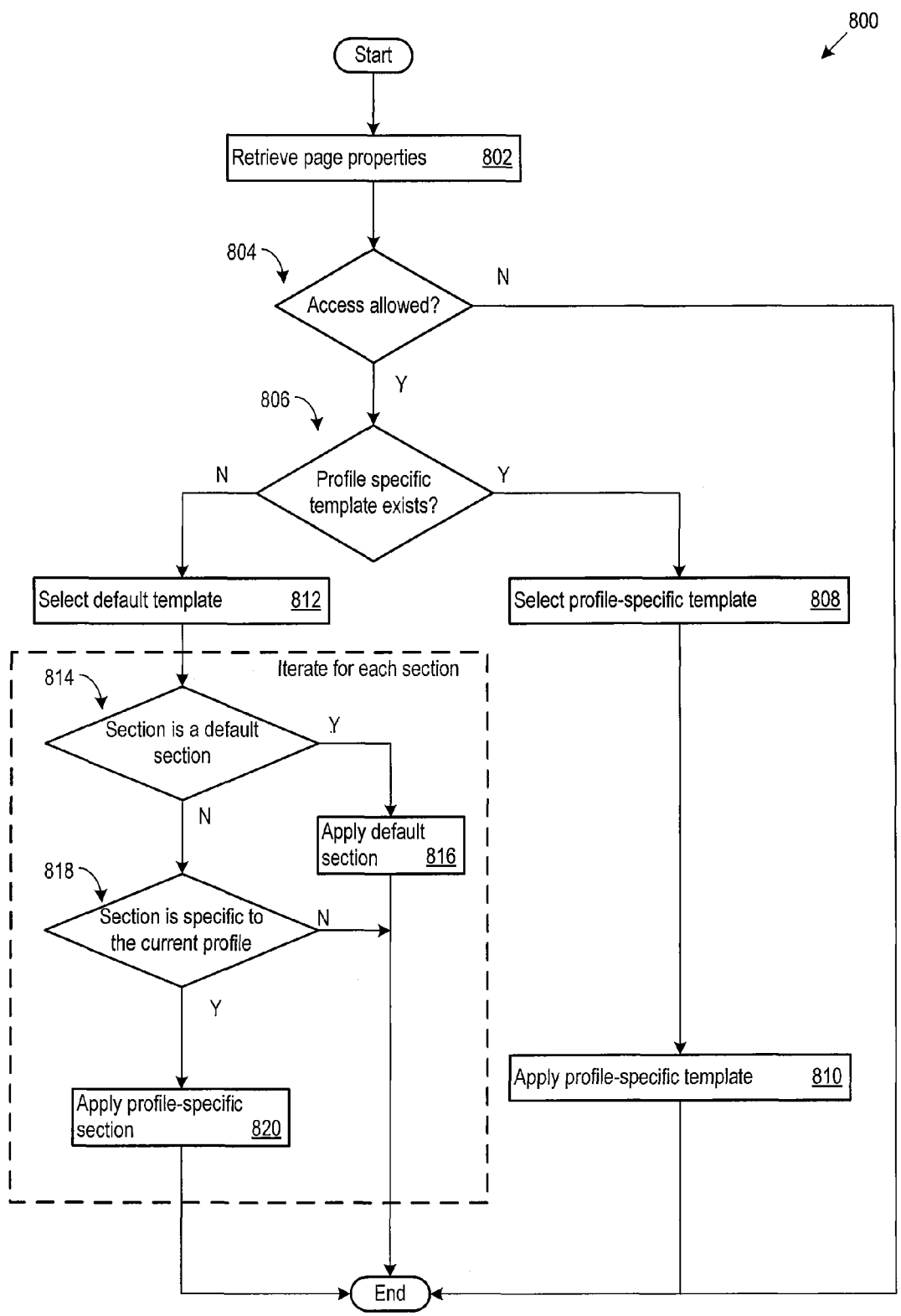
FIG. 8 shows a flow diagram of logic that an embodiment of the invention may employ to provide a customizable GUI.

FIG. 8 shows a flow diagram 800 of logic that the workflow program 352 in the system 300 may implement for displaying a web page bound to a state. When the system 300 selects a state, the system 300 may identify a web page bound to the state (not shown). The system 300 may also retrieve through the sitemap provider 314 information associated with the web page (802). The information may include, for example, accessibility information indicating whether or not a user may access the web page. The system 300 determines, based on the retrieved page properties, whether or not the current user may have access to the web page (804). If the current user has access to the web page, the system 300 proceeds to build the user interface of the web page.

The web page may comprise one or more building blocks called webparts. A webpart may contain profile-independent computer software code for user interface definition and user input retrieval. The webpart may access the reference data source 316 to load lists of values used by the web portal application for implementing a business logic or configuration data necessary for the web page. The webpart may contain computer software code which requests the data validation provider 312 to validate data entry by the user. A web part may also utilize templates to build the user interface. The "profiling" of the web page and/or the webpart may be achieved through templates. A template may be retrieved through the template manager 310.

Continuing with FIG. 8, when accessing a template required by a webpart, the system 300, through the template manger 310, retrieves a "profiled" template for the webpart. In other words, the system 300 determines whether or not a profile-specific template exists for the requested template (806). If a profile-specific template exists, the profile specific template is selected (808), and the system applies the profile-specific template in building the user interface (810). If a profile-specific template does not exist, then the system 300 may select a default template (812).

In an illustrative example, when the workflow program 352 requests a "Hompage.html" template for displaying a home page of the web portal application to a profileA-user, the system 300 may search through the memory 304 (resource repository 406) for a profile specific template for "Homepage.html". A profile specific template may be identified with the name of the profile appended to the end of the name of the template. For example, a profile-specific template for the default template "Homepage.html" may be named "Homepage_profileA.html". If a template named "Homepage_profileA.html" is identified in the memory 304 (resource repository 406), the workflow program 352 may select the template "Homepage_profileA.html". If a template named "Hompage_profileA.html" is not found in the memory 304 (resource repository 406), then a default template, "Homapge.html", may be selected.

A template in turn may contain one or more sections, which may include a default section and/or a profile-specific section. Continuing further with FIG. 8, once a template is selected, the system 300 further determines whether or not, for each section in the template, the section is a default section (814). If the section is a default section, the system 300 applies the default section (816). If the section is not a default section, the system determines whether or not the section is a profile-specific section which corresponds to the profile of the current user (818). If the section is not a profile-specific section which corresponds to the profile of the current user, the system does not apply the profile-specific section. If the section is a profile-specific section which corresponds to the profile of the current user, the system applies the profile-specific section (820). For example, if the profile of the current user is "profileA", then the system 300 applies all the sections marked for "profileA", and may not apply sections marked, for example, for "profileB", "profileC" or "profileD". If a section is a default section, the system 300 may apply the section in building the user interface regardless of the current user's profile.

The templates are now described in more detail. The templates may be implemented using HTML. However, the templates may also be implemented using other computer programming languages. A template may be designated and defined as a page template, defining a specific web page that defines the controls and the layout for the web page. However, a template may also be designated and defined as a layout template to specify a recurring page layout element of a web page, such as frames, information boxes or data entry fields. A page template may contain one or more layout templates. A layout template may contain one or more of other layout templates.

FIG. 9 shows an example of a portion of code 900 for a page template. At the beginning of the code 900 for the page template, generic layout templates 902 may be called. A generic layout template may be a layout template that establishes the overall layout of a webpage which may be uniform across all profiles. Since the generic layout templates 902 are the same for all profiles, they may be called and reused by other templates as well. The page template may further include sections 904 and 906 which define the individual page layout features specific to the page template. Sections 904 and 906 may further include code 908 for specifically declaring and positioning page layout elements inside the webpage.

Figure 10:
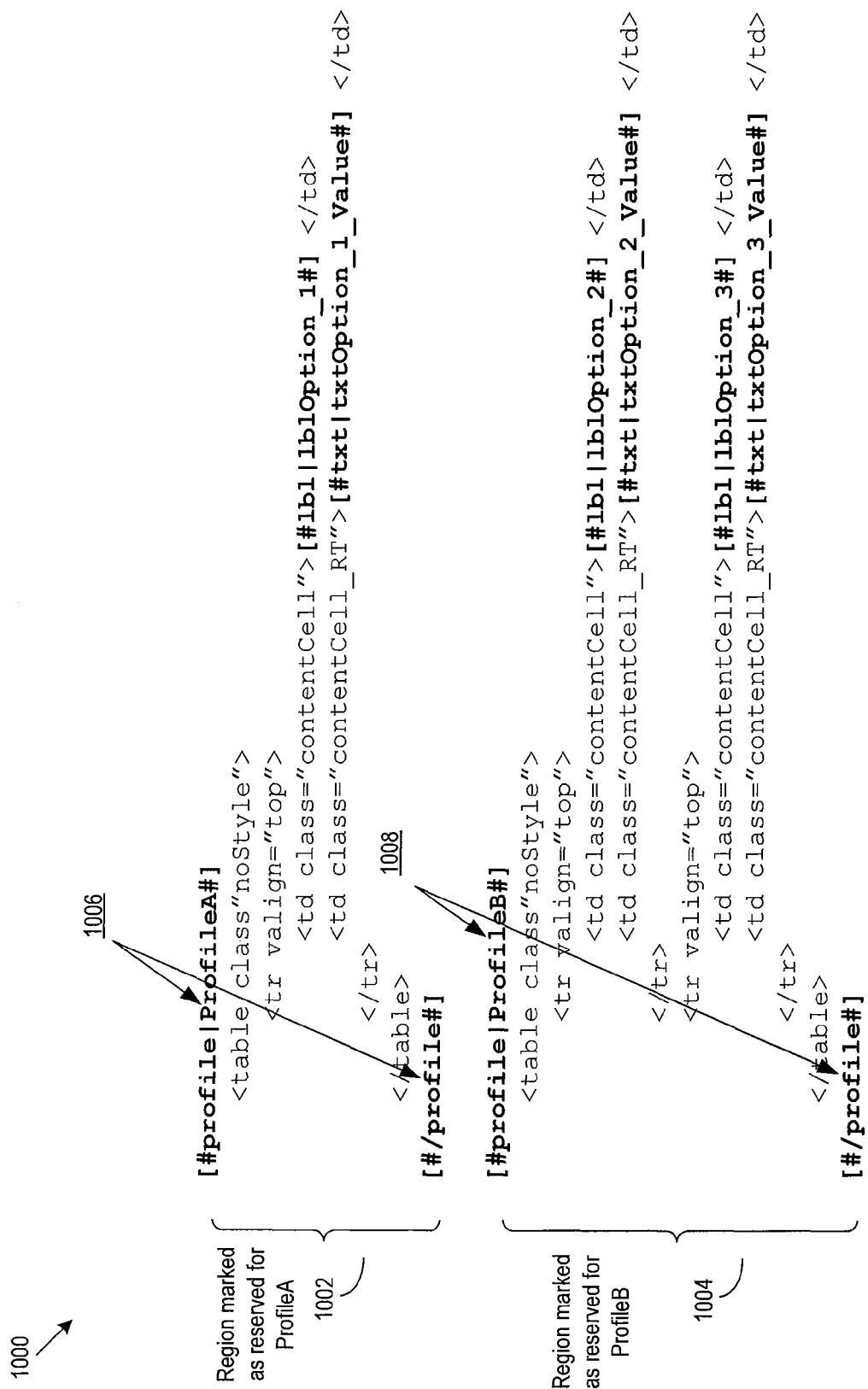
FIG. 10 shows a detailed example of software code for profile-specific sections of a template used for implementing a customizable GUI.

FIG. 10 shows a detailed example of a portion of computer software code 1000 for implementing profile-specific sections of a template. As discussed above, a template may contain sections which may be specifically designated for a certain profile. The template may contain a "profileA"-section 1002, and a "profileB"-section 1004. A section may be implemented as a layout template or as any portion of a page template, and may be marked by an indicator containing the name of the profile. For example, section 1002 may contain a section identifier 1006 indicating that the section 1002 is a section specific for "profileA". Section identifier 1008 indicates that the section 1004 is a section specific for "profileB".

Figure 11:
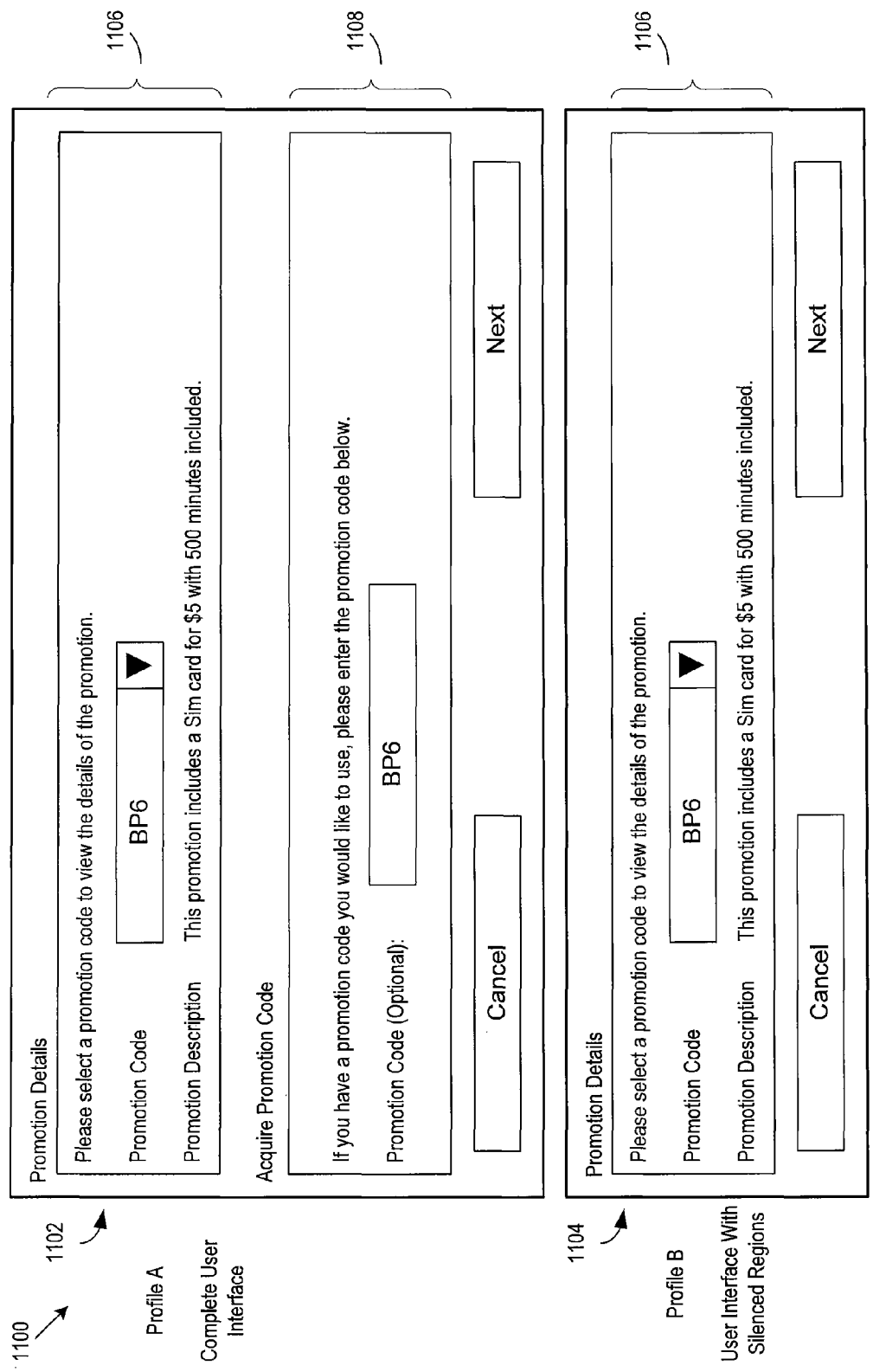
FIG. 11 shows an example of a customizable GUI.

FIG. 11 shows an example 1100 of two user interfaces built using an identical template containing a default section and a profileA-specific section (profile-specific section for a profileA user). The user interface 1102 may represent a web page displayed to a "profileA"-user, and the user interface 1104 may represent a web page displayed to a "profileB"-user. The template used to build both interfaces 1102 and 1104 may be the same template containing a default section for displaying the page feature 1106 and a profileA-specific section for displaying the page feature 1108. When building a user interface for a profileA-user, the system displays both the default section 1106 and the profileA-specific section 1108. However, when building a user interface for a profileB-user, the system only displays the default section 1106 and silences the profileA-specific section 1108, since the profile of the user ("profileB") does not match the profileA-specific section 1108. A profile-specific section may be associated with only a single profile or may be associated with a plurality of profiles.

Figure 12:
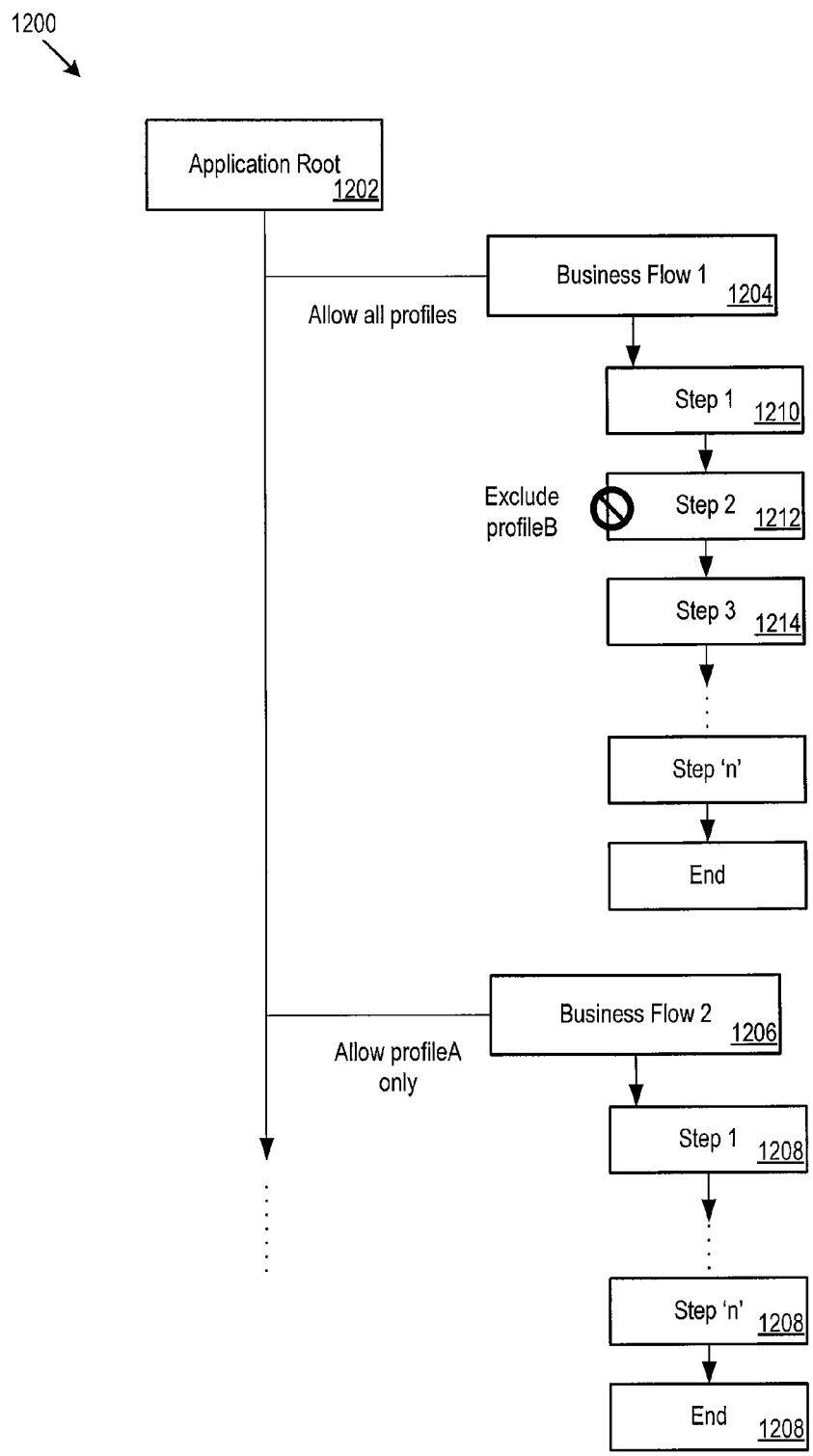
FIG. 12 shows a diagram representing the structure of a sitemap resource file.

FIG. 12 shows a diagram 1200 representing a structure of a sitemap resource file 346. The sitemap resource file 346 may store information regarding the structure of the workflow of the web portal application. For example, the system 300 may use the information from the sitemap resource file 346 to display a sitemap graph in the form of a tree view showing graphically the hierarchy of web pages of the web portal application. The system 300 may also access the sitemap resource file 346 to determine the accessibility of a user to a certain web page.

The sitemap resource file 346 may be implemented as a plurality of nodes arranged in a tree structure. Each node may represent a state or a webpage of the web portal application and may store information indicating the next node or nodes ("child"/"children" nodes, or "descendent" nodes) in the tree structure. Each node may also include information regarding the state or the webpage such as page properties of the state or the webpage. Each node may further include tags 350 (not shown in FIG. 12; shown in FIG. 3). A tag may contain accessibility information of a user to the page represented by the node. For example, the sitemap resource file 346 may include an "application root" node 1202, having child nodes 1204 and 1206. Each child node may represent the initial states of "business flow 1" and "business flow 2", respectively. The child node 1204 may include a tag containing accessibility information which specifies that the node may be accessed by all types of users. The child node 1206 may include a tag containing accessibility information which specifies that the node may only be accessed by a profileA-user.

The accessibility information of a node 350 may be propagated downwards in the tree structure. In other words, if the node 1206 is tagged such that only profileA-users are granted access, the descendent nodes 1208, which are located downstream of the node 1206, are also accessible only by profileA-users, despite the fact that the descendent nodes 1208 are not individually tagged with such accessibility information. The accessibility information of a node may also be specified not to be propagated downwards. For example, the node 1204 may contain a child node 1210, which in turn may have a child node 1212. Even though its grand-parent node 1204 is tagged to allow access to all types of users, the node 1212 may be tagged so that the node is inaccessible to a profileB-user. The accessibility of the node 1212 may also be specified not to propagate downwards, and the child node of the node 1212, the node 1214, may again be accessible to all types of users.

The sitemap provider 314 manages the sitemap resource file 346. The sitemap provider may be implemented, for example, using the sitemap provider component of the ASP.NET™ framework. When the workflow program 352 requests information from a node of the sitemap resource file 346, the sitemap provider 314 identifies the profile of the current user. The sitemap provider 314 also searches through the sitemap resource file 346 for the requested node. The sitemap provider 314 may begin the search at the "application root" node 1202, and proceed down the descendent nodes of the node 1202, until the requested node is identified. The search may be made using the binary search method. However, any other searching methods suitable for searching a tree structure may be used. During the search, the sitemap provider 314 may identify the tag of any parent node of the requested node which includes accessibility information specified to be propagated downwards. When the requested node is identified, the sitemap provider 314 determines whether or not the current user has access to the requested node based on the profile of the user, the accessibility information which is propagated down from the parent nodes, and the accessibility information of the tag of the identified node. If the sitemap provider determines that the user has access to the requested node, the sitemap provider causes the requested information of the identified node to be provided to the workflow program 352.

In an illustrative example with reference to FIG. 12, if a workflow program 352 requests information contained in a child node 1208 of the node 1206, the sitemap provider 314 begins with the node 1202 and searches down the descendant nodes of the node 1202 until the sitemap provider identifies the requested child node 1208 of the parent node 1206. During the search, the sitemap provider 314 may identify the parent node 1206 which may include a tag containing accessibility information granting access only to a profile-A user. The tag may also be specified to propagate downwards. When the sitemap provider 314 identifies the child node 1208, the node 1208 may not be tagged with information which restricts access to any users. If the current user is a profile-A user, the sitemap provider 314 may cause the requested information contained in the identified node to be provided to the workflow program 352. However, if the current user is a profile-B user, the sitemap provider 314 may determine that the user does not have access to the identified node and may not cause the requested information contained in the identified node to be provided to the workflow program 352. In the latter case, the sitemap provider 314 determines that the current user does not have access to the identified node since the parent node 1206 of the identified node includes a tag which allows access only to a profile-A user and which is specified to be propagated downwards.

The system 300 may also allow the workflow application 352 to validate data received from a user. The workflow application 352 may request that the data validation provider 312 determine whether or not data received from a user conforms to predetermined rules. For example, data input by a user may be a bank account number to which a payment is to be made, and the data validation provider 312 may determine ("validate") whether or not the bank account number supplied by the user has the correct number of digits. The workflow application 352 may request validation of data, for example, using a line of code requesting validation of data ("validation request code") which may read, for example:

ClientValidate("txtBankAccount", "check_exactLenght", "22", "blocking", "Please check the Bank Account Number")

Validation may be done differently on the same piece of data depending on the profile of a user. For example, bank account information of a profileA-user may be validated to determine whether or not the length of the bank account number is 22 digits. However, bank account information of a profileB-user may be validated for a 15-digit bank account number. A profile-specific validation may be indicated by including the name of the profile as one of the parameters in the validation request code. For example, validation request code for a profileA-user may read, for example:

ClientValidate("ProfileA", "txtBankAccount", "check_exactLenght", "22", "blocking", "Please check the Bank Account Number")

Validation request code for a profileB-user may read, for example:

ClientValidate("ProfileB", "txtBankAccount", "check_exactLenght", "15", "blocking", "Please check the Bank Account Number")

In an embodiment, multiple validation request code may exist for the same type of data, where each code may specify a specific profile (profile-specific validation request code) or may not specify any profile (default validation request code). If two or more instances of contradictory validation request code exists for the same type of data, the system 300 determines whether or not a profile-specific validation request code exists for the current user's profile. If the system 300 determines that a profile-specific validation request code exists, the system selects the corresponding code and requests validation of data using the profile-specific validation request code. If the system 300 determines that a profile-specific validation request code does not exist, the system requests validation of data using a default validation request code.

In another embodiment, the validation request code may be "profiled". In other words, a single validation request code may exist for a single type of data without specifying a profile with which the code is associated. When the workflow program 352 requests the execution of the validation request code to the validation provider 312, the validation provider 312 may determine whether a predetermined rule specific to the current user's profile exists for the requested validation. If a profile-specific rule exists, the validation provider 312 may perform the validation based on the predetermined profile-specific rule. If a profile-specific predefined rule does not exist, the validation provider 312 may perform the validation based on a default predetermined rule. The predetermined rule may be stored in the resource repository 406.

The system 300 may be implemented in many different ways. For example, although some features are shown stored in computer-readable memories (e.g., as logic implemented as computer-executable instructions or as data structures in memory), all or part of the system and its logic and data structures may be stored on, distributed across, or read from other machine-readable media. The media may include hard disks, floppy disks, CD-ROMs, or a signal, such as a signal received from a network or received over multiple packets communicated across the network.

The system 300 may be implemented with additional, different, or fewer components. As one example, a processor may be implemented as a microprocessor, a microcontroller, a DSP, an application specific integrated circuit (ASIC), discrete logic, or a combination of other types of circuits or logic. As another example, memories may be DRAM, SRAM, Flash or any other type of memory. The processing capability of the system may be distributed among multiple components, such as among multiple processors and memories, optionally including multiple distributed processing systems. Resource repositories, databases, and other data structures may be separately stored and managed, may be incorporated into a single memory or database, may be logically and physically organized in many different ways, and may implemented with different types of data structures such as linked lists, hash tables, or implicit storage mechanisms. Logic, such as programs or circuitry, may be combined or split among multiple programs, distributed across several memories and processors, and may be implemented in a library, such as a shared library (e.g., a dynamic link library (DLL)). The DLL, for example, may store code that prepares intermediate mappings or implements a search on the mappings. As another example, the DLL may itself provide all or some of the functionality of the system, tool, or both.

As one specific example, the processing executed by the logic described above may be implemented with one or more Microsoft™ Windows Workflow Foundation™ technology. The processes may execute in any environment that supports the Microsoft™ Windows Workflow Foundation™ technology system. Examples of such environments include computer systems running the Windows™ operating system and the Unix™ operating system.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A method for customizing a software application, comprising:
   storing in a memory a profile associated with a user;
   storing in the memory a plurality of states, each state being associated with a user interface;
   storing in the memory a plurality of transitions including a default transition and a profile-specific transition, each transition including a task to be performed by a workflow program;
   executing with a processor the workflow program, the workflow program comprising logic that when executed causes the processor to:
      identify the profile associated with the user;
      display the user interface of a state of the plurality of states;
      receive from the user a transition input available for the state, where the transition input is associated with a transition of the plurality of transitions;
      determine whether or not a profile-specific transition associated with the received transition input which corresponds to the profile of the user exists;
      if a profile-specific transition associated with the received transition input which corresponds to the profile of the user exists, retrieve the profile-specific transition associated with the received transition input as a retrieved transition;
      if no profile-specific transition associated with the received transition input which corresponds to the profile of the user exists, retrieve the default transition associated with the received transition input as the retrieved transition; and
      perform the task included in the retrieved transition.

2. The method for customizing the software application of claim 1,
   wherein the logic to determine whether or not a profile-specific transition exists further includes logic to request a controller for the transition associated with the received transition input, where the controller searches the memory for a profile-specific transition associated with the received transition input which corresponds to the profile of the user;
   wherein the logic to retrieve the profile-specific transition associated with the received transition input as the retrieved transition further includes logic to retrieve the profile-specific transition using the controller; and
   wherein logic to retrieve the default transition associated with the received transition input as the retrieved transition further includes logic to retrieve the default transition using the controller.

3. The method for customizing the software application of claim 1, further including storing in the memory a plurality of templates,
   wherein the logic to display the user interface of the state of the plurality of states further includes logic to retrieve from the memory a template of the plurality of templates and logic to apply the retrieved template to the user interface.

4. The method for customizing the software application of claim 3,
   wherein the plurality of templates includes a default template and a profile-specific template,
   wherein the logic to retrieve the template further includes logic to:
      determine whether or not a profile-specific template associated with the user interface corresponding to the profile of the user exists;
      if a profile-specific template associated with the user interface corresponding to the profile of the user exists, retrieve the profile-specific template as the retrieved template;
      if no profile-specific template associated with the user interface corresponding to the profile of the user exists, retrieve the default template as the retrieved template.

5. The method for customizing the software application of claim 3,
   wherein the template of the plurality of templates includes a default section and a profile-specific section,
   wherein the logic to apply the template further comprises logic to:
      apply a default section; and
      if a profile-specific section corresponding to the profile of the user exists, apply the profile-specific section.

6. The method for customizing the software application of claim 1, wherein the profile-specific transition includes a profile-specific task to be performed by the workflow program.

7. The method for customizing the software application of claim 1, wherein the tasks to be performed by the workflow program includes proceeding to a next state of the plurality of states.

8. A system for customizing a software application, comprising:
   a processor;
   a computer readable memory coupled to the processor and storing:
      a profile associated with a user;
      a plurality of states, each state being associated with a user interface;

a plurality of transitions, including a default transition and a profile-specific transition, each transition including a task to be performed by a workflow program;

a workflow program, the workflow program comprising logic that when executed causes the processor to:

identify the profile associated with the user;

display the user interface of a state of the plurality of states based on the information for displaying the user interface;

receive from the user a transition input available for the state, where the transition input is associated with a transition of the plurality of transitions;

determine whether or not a profile-specific transition associated with the received transition input which corresponds to the profile of the user exists;

if a profile-specific transition associated with the received transition input which corresponds to the profile of the user exists, retrieve the profile-specific transition associated with the received transition input as the retrieved transition;

if no profile-specific transition associated with the received transition input which corresponds to the profile of the user exists, retrieve the default transition associated with the received transition input as the retrieved transition; and perform the task included in the retrieved transition.

9. The system for customizing the software application of claim 8, wherein the logic to determine whether or not a profile-specific transition exists further includes logic to request a controller for the transition associated with the received transition input, where the controller searches the memory for a profile-specific transition associated with the received transition input which corresponds to the profile of the user;

wherein the logic to retrieve the profile-specific transition associated with the received transition input as the retrieved transition further includes logic to retrieve the profile-specific transition using the controller; and wherein the logic to retrieve the default transition associated with the received transition input as the retrieved transition further includes logic to retrieve the default transition using the controller.

10. The system for customizing the software application of claim 8, the memory further storing a plurality of templates, wherein the logic to display the user interface of the state of the plurality of states further includes logic to retrieve from the memory a template of the plurality of templates and logic to apply the retrieved template to the user interface.

11. The system for customizing the software application of claim 10, wherein the plurality of templates includes a default template and a profile-specific template, wherein the logic to retrieve the template further includes logic to:

determine whether or not a profile-specific template associated with the user interface corresponding to the profile of the user exists;

if a profile-specific template associated with the user interface corresponding to the profile of the user exists, retrieve the profile-specific template as the retrieved template;

if no profile-specific template associated with the user interface corresponding to the profile of the user exists, retrieve the default template as the retrieved template.

12. The system for customizing the software application of claim 10, wherein the template of the plurality of templates includes a default section and a profile-specific section, wherein the logic to apply the template to the user interface further comprises logic to:

apply the default section; and if the profile-specific section corresponds to the profile of the user, apply the profile-specific section.

13. The system for customizing software application of claim 8, wherein the profile-specific transition includes a profile-specific task to be performed by the workflow program.

14. The system for customizing software application of claim 8, wherein the task to be performed by the workflow program includes proceeding to a next state of the plurality of states.

15. A method for customizing a software application, comprising:

storing in a memory a profile associated with a user;

storing in the memory a sitemap resource file, wherein the sitemap resource file includes a node representing a state of a workflow, and wherein the node includes:

a tag identifying accessibility of a user associated with a profile to the node, and a state information of the state represented by the node;

receiving a request from a workflow program for the state information of a state of the node;

identifying the profile associated with the user;

searching the sitemap resource file for the node representing the state included the requested state information;

identifying the tag of the node representing the state including the requested state information;

determining accessibility of the user to the requested state based on the tag of the node representing the requested state; and if the requested state is determined to be accessible to the user, communicating the state information to the workflow program.

16. The method for customizing the software application of claim 15, wherein the sitemap resource file further includes a parent node of the node representing the state of the workflow, wherein the parent node includes a tag identifying accessibility of a user associated with a profile to the parent node, the method further comprising:

identifying the tag of the parent node;

determining accessibility of the user to the requested state based on the tag of the parent node.

17. A system for customizing a software application, comprising:

an application component;

a resource manager in communication with the application component, the resource manager storing a plurality of resources which includes a default resource and a profile-specific resource;

a resource repository in communication with the application component and the resource manager; and a profile manager in communication with the resource manager;

wherein the resource manager:
receives from the application component a request for a resource of the plurality of resources,
receives from the profile manager a profile information associated with a user,
determines whether or not a profile-specific resource associated with the requested resource which corresponds to the profile of the user exists in the resource repository;
if a profile-specific resource associated with the requested resource which corresponds to the profile of the user exists in the resource repository, provides the profile-specific resource associated with the requested resource which corresponds to the profile of the user to the application component as the requested resource; and
if no profile-specific resource associated with the requested resource which corresponds to the profile of the user exists, provides a default resource to the workflow engine associated with the requested resource which corresponds to the profile of the user to the application component as the requested resource.

18. The system for customizing the software application of claim 17,
wherein the resource manager comprises a controller;
wherein the plurality of resources further includes a plurality of transitions including a default transition and a profile-specific transition, each transition including a task to be performed by the application component; and
wherein the default resource and the profile-specific resource comprises a default transition and a profile-specific transition, respectively.

19. The system for customizing the software application of claim 17,
wherein the resource manager comprises a controller;
wherein the plurality of resources further includes a plurality of states including a default state and a profile-specific state, each state being associated with a user interface; and
wherein the default resource and the profile-specific resource comprises a default state and a profile-specific state, respectively.

20. The system for customizing the software application of claim 17,
wherein the resource manager comprises a template manager;
wherein the plurality of resources further includes a plurality of templates including a default template and a profile-specific template;
wherein the default resource and the profile-specific resource comprises the default template and the profile-specific template, respectively;
wherein the request from the application component for a resource of the plurality of resources comprises a request for a template of the plurality of templates; and
wherein the application component applies the requested template to a user interface.

21. The system for customizing the software application of claim 20,
wherein a template of the plurality of templates includes a default section and a profile-specific section.

22. The system for customizing the software application of claim 18, wherein the profile-specific transition includes a profile-specific task to be performed by the application component.

23. The system for customizing software application of claim 18, wherein the task to be performed by the application component includes a task to proceed from a state to a second state, wherein a state is associated with a user interface.

* * * * *